United States Patent
Kawamoto et al.

(10) Patent No.: US 10,626,197 B2
(45) Date of Patent: Apr. 21, 2020

(54) ETHYLENE-VINYL ALCOHOL COPOLYMER, PROCESS FOR PRODUCING THE SAME, AND LAMINATE

(71) Applicant: THE NIPPON SYNTHETIC CHEMICAL INDUSTRY CO., LTD., Osaka (JP)

(72) Inventors: Kazuki Kawamoto, Osaka (JP); Takashi Suzuki, Osaka (JP); Nobuaki Sato, Osaka (JP); Koji Yamada, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 27 days.

(21) Appl. No.: 15/567,508

(22) PCT Filed: Apr. 22, 2016

(86) PCT No.: PCT/JP2016/062840
§ 371 (c)(1),
(2) Date: Oct. 18, 2017

(87) PCT Pub. No.: WO2016/171278
PCT Pub. Date: Oct. 27, 2016

(65) Prior Publication Data
US 2018/0105615 A1    Apr. 19, 2018

(30) Foreign Application Priority Data

Apr. 23, 2015 (JP) ................. 2015-088467

(51) Int. Cl.
| | | |
|---|---|---|
| C08F 216/06 | (2006.01) | |
| C08F 8/12 | (2006.01) | |
| C08F 210/02 | (2006.01) | |
| C08F 218/08 | (2006.01) | |
| B32B 27/28 | (2006.01) | |
| B32B 27/30 | (2006.01) | |

(52) U.S. Cl.
CPC ............. C08F 8/12 (2013.01); B32B 27/28 (2013.01); B32B 27/306 (2013.01); C08F 210/02 (2013.01); C08F 216/06 (2013.01); C08F 218/08 (2013.01); C08F 2800/10 (2013.01)

(58) Field of Classification Search
CPC .................................................. C08F 216/06
See application file for complete search history.

(56) References Cited

U.S. PATENT DOCUMENTS

2002/0035193 A1* 3/2002 Weitzel ............. C04B 26/02
    524/460
2002/0040107 A1 4/2002 Kawahara et al.

FOREIGN PATENT DOCUMENTS

| CN | 1333301 | 1/2002 |
|---|---|---|
| CN | 102942649 | 2/2013 |
| CN | 104098731 | 10/2014 |
| CN | 104098732 | 10/2014 |
| EP | 0454850 A1 | 11/1991 |
| JP | 60-192705 A | 10/1985 |
| JP | 2002-121204 A | 4/2002 |
| JP | 2002-148248 A | 5/2002 |
| JP | 2004-323687 | 11/2004 |
| JP | 2005-029701 | 2/2005 |
| JP | 2012-250356 A | 12/2012 |

OTHER PUBLICATIONS

Partial Search Report issued with respect to European patent application No. 16783299.7, dated Oct. 1, 2018.
International Search Report from Application No. PCT/JP2016/062840, dated Jul. 26, 2016.
Written Opinion of the International Search Authority from Application No. PCT/JP2016/062840, dated Jul. 26, 2016.
Office Action issued in corresponding Japanese patent application No. 2016-547132 dated Dec. 3, 2019 w/ machine translation.
Office Action dated Aug. 22, 2019 in corresponding EP patent application No. 16783299.7.
Office Action dated Sep. 2, 2019 in Chinese patent application No. 201680023598.3 w/ English translation.

* cited by examiner

*Primary Examiner* — Jeffrey C Mullis
(74) *Attorney, Agent, or Firm* — Greenblum & Bernstein, P.L.C.

(57) ABSTRACT

An object of the invention is to provide an EVOH which has improved melt moldability and is excellent in terms of gas barrier property and secondary formability. The present invention relates to an ethylene-vinyl alcohol copolymer that, when examined by liquid chromatography, gives an ethylene content distribution curve which has at least two peaks and in which the ethylene content (a) of a component that shows a highest peak (A), the ethylene content (b) of a component that shows a second highest peak (B), and the proportion (v) and distribution of component(s) (V) having ethylene contents (w) corresponding to specific regions (W) are within specific ranges.

4 Claims, 3 Drawing Sheets

[Fig. 1]
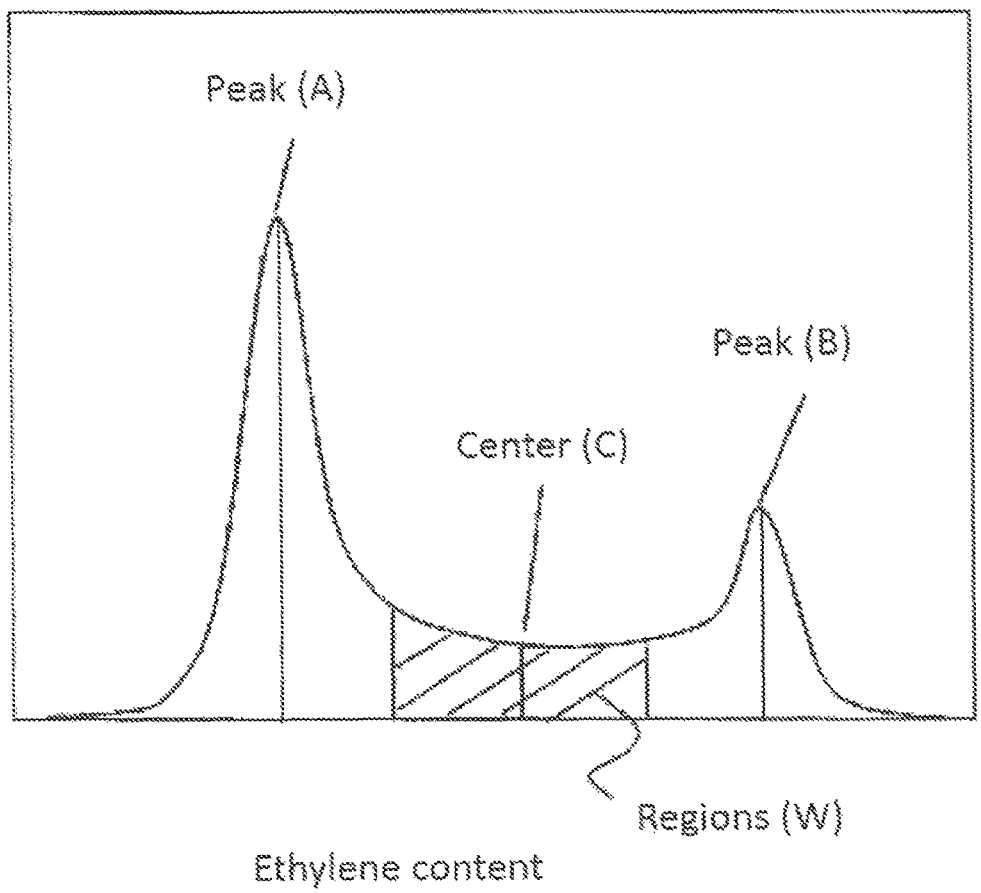
[Fig. 2]
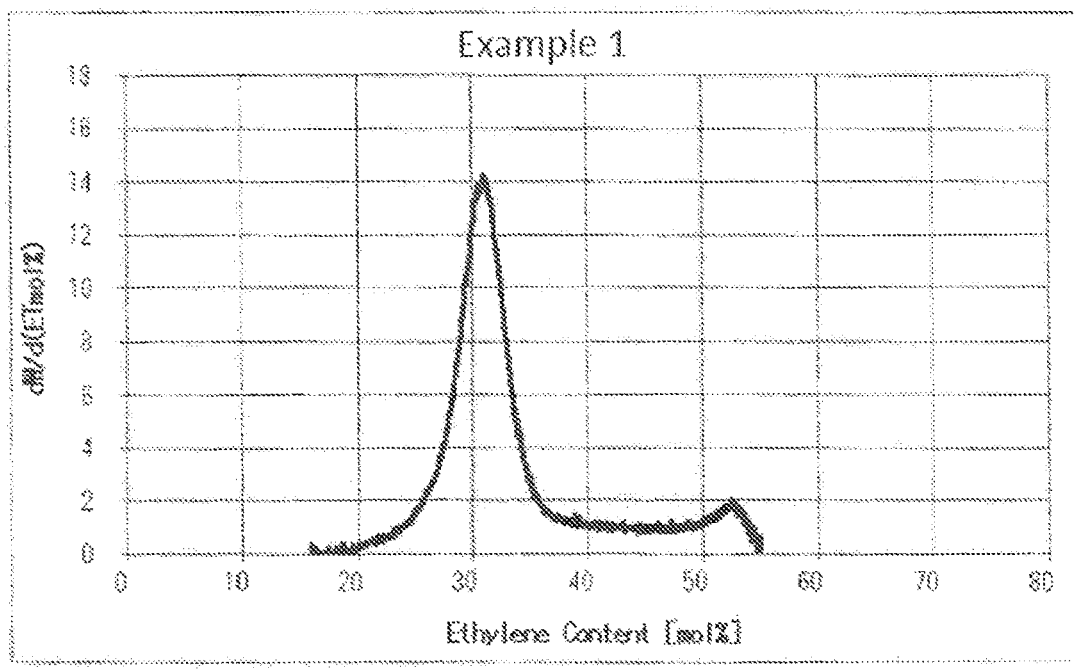

[Fig.3]
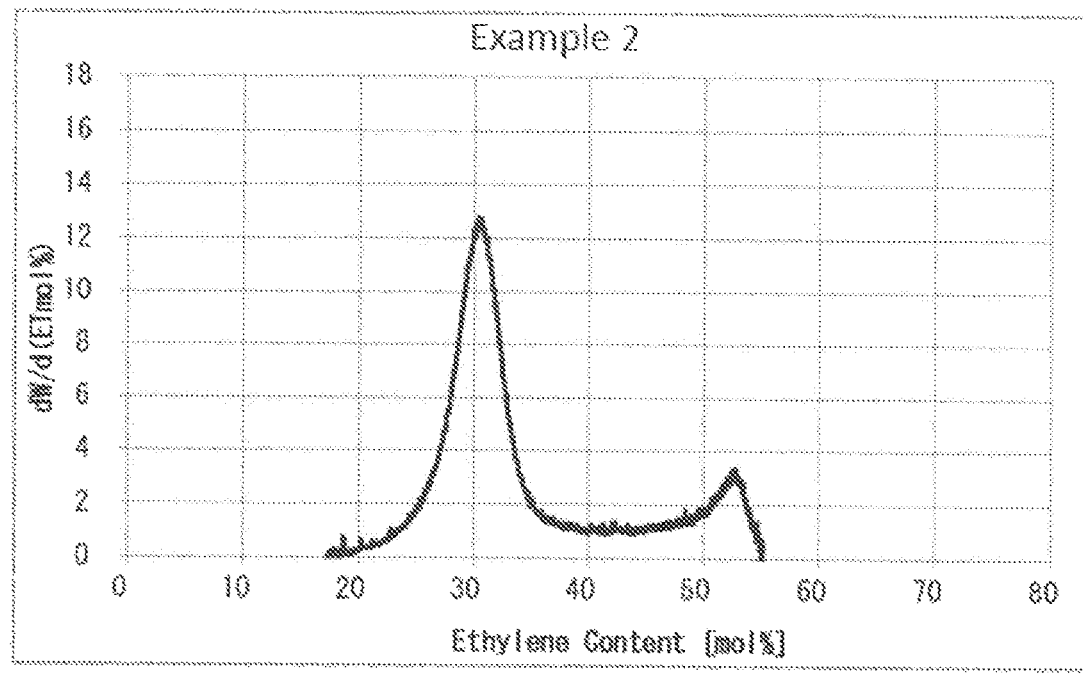
[Fig.4]
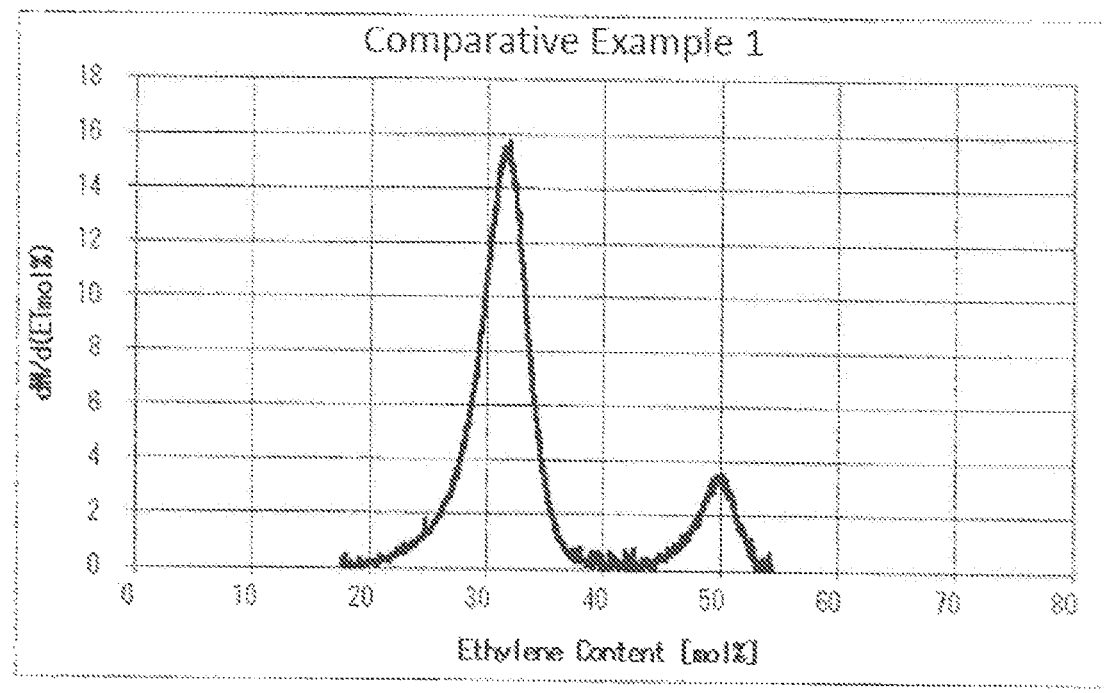

[Fig.5]
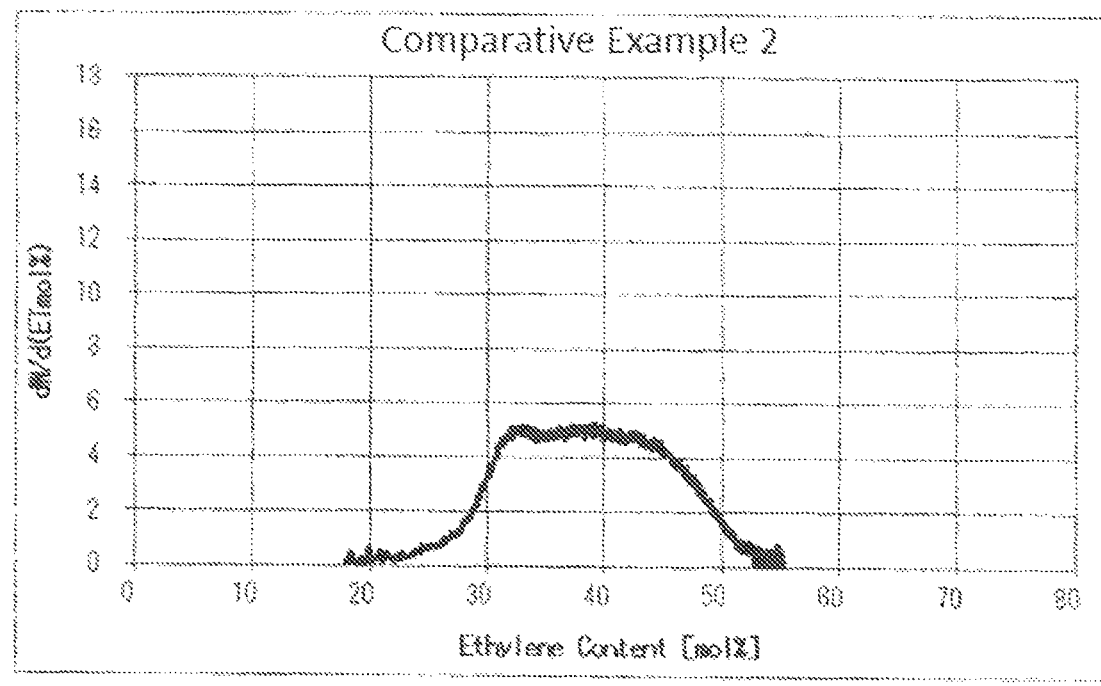

ETHYLENE-VINYL ALCOHOL COPOLYMER, PROCESS FOR PRODUCING THE SAME, AND LAMINATE

TECHNICAL FIELD

The present invention relates to an ethylene-vinyl alcohol copolymer. More particularly, the invention relates to an ethylene-vinyl alcohol copolymer excellent in terms of gas barrier property, melt moldability, and secondary formability, a process for producing the copolymer, and a laminate including the copolymer,

BACKGROUND ART

Ethylene-vinyl alcohol copolymers (hereinafter often abbreviated to EVOHs), in particular, products of saponification of ethylene-vinyl acetate copolymers, are excellent in terms of various properties including gas barrier property and mechanical strength and are hence extensively used in various applications including films, sheets, containers, and fibers.

The saponification products are produced by copolymerizing ethylene and vinyl acetate, removing the unreacted vinyl acetate, and then saponifying the ethylene-vinyl acetate copolymers obtained.

Specifically, the polymerization for producing an ethylene-vinyl acetate copolymer is usually conducted using a high-pressure polymerization tank equipped with a jacket and a reflux condenser, and ethylene and vinyl acetate are introduced as starting materials into an alcohol solvent to conduct the polymerization. After completion of the polymerization, the unreacted vinyl acetate is removed to obtain an ethylene-vinyl acetate copolymer. Usually, the unreacted vinyl acetate is removed to 100 ppm or less. Thereafter, the copolymer is further saponified with an alkali catalyst into an EVOH, which is usually extruded in the form of strands into a coagulating bath and cut into pellets.

EVOHs generally have a tendency that the higher the ethylene content, the better the melt moldability and stretch formability and that the lower the ethylene content, the better the gas barrier properties. It is, however, difficult to attain both melt moldability or stretch formability and gas barrier properties. In order to obtain an EVOH which combines stretch formability and gas barrier properties, a process has been proposed in which copolymerization of ethylene and vinyl acetate is conducted under two or more different sets of conditions so that, for example, the ethylene pressure and/or the temperature is changed stepwise (see, for example, Patent Document 1).

PRIOR ART DOCUMENT

Patent Document

Patent Document P-A-60-192705

SUMMARY OF THE INVENTION

Problem that the Invention is to Solve

However, the technique disclosed in Patent Document 1 has had a drawback, for example, in that when melt-molding a composition of different EVOHs differing in ethylene content, there have been cases where the molding becomes unstable due to discharge fluctuations or a large neck-in.

Accordingly, an object of the invention is to provide, under these circumstances, by using components (EVOH) differing in ethylene content, an EVOH which has improved melt moldability and has excellent gas barrier properties and secondary formability.

Means for Solving the Problem

The present inventors diligently made investigations under those circumstances. As a result, the inventors directed attention to an ethylene content distribution of an EVOH including components (EVOH) differing in ethylene content, and have discovered that an EVOH which, when examined by liquid chromatography, gives an ethylene content distribution curve that has at least two peaks and in which components (EVOH) having ethylene contents corresponding to between the highest peak (A) and the second highest peak (B) are contained in a given amount has excellent melt moldability and is further excellent in terms of gas barrier property and secondary formability. The present invention has been thus completed.

Essential points of the present invention are as follows.

[1] An ethylene-vinyl alcohol copolymer
which, when examined by liquid chromatography, gives an ethylene content distribution curve that has at least two peaks and that satisfies the following [1] to [IV]:

[I] an ethylene content (a) of a component which shows a highest peak (A) is 20-35% by mole;

[II] an ethylene content (b) of a component which shows a second highest peak (B) is 45-60% by mole;

[III] when the abscissa ranging from the peak (A) to the peak (B) is divided into four equal parts, then a proportion (v) of component(s) (V) which has ethylene content (w) corresponding to the two regions (W) having therebetween a center (C) that lies midway between the peak (A) and the peak (B) to the whole copolymer is 5-25% by weight; and

[IV] a maximum value of the ordinate in the two regions (W) is not larger than two times an average value of the ordinate in the two regions (W).

[2] The ethylene-vinyl alcohol copolymer according to above [1],
wherein a difference between the ethylene content (a) of the component which shows the peak (A) and the ethylene content (b) of the component which shows the peak (B) is 10-30% by mole.

The present invention further relates to a process for producing the ethylene-vinyl alcohol copolymer.

[3] A process for producing the ethylene-vinyl alcohol copolymer according to above [1] or [2], comprising:
copolymerizing ethylene with a vinyl ester compound in a solvent to obtain an ethylene-vinyl ester copolymer; and
further saponifying the ethylene-vinyl ester copolymer to produce the ethylene-vinyl alcohol copolymer,
wherein the copolymerization reaction between the ethylene and the vinyl ester compound is conducted while continuously changing an ethylene pressure.

[4] A process for producing an ethylene-vinyl alcohol copolymer, comprising:
copolymerizing ethylene with a vinyl ester compound in a solvent to obtain an ethylene-vinyl ester copolymer; and
further saponifying the ethylene-vinyl ester copolymer to produce the ethylene-vinyl alcohol copolymer,
wherein the copolymerization reaction between the ethylene and the vinyl ester compound is conducted in a manner in which a preceding reaction for polymerizing the monomers while keeping an ethylene pressure and a temperature constant, an intermediate reaction for polymerizing the monomers while continuously changing the ethylene pressure and the temperature over a time period, and a later-stage reaction for polymerizing the monomers while the ethylene pressure and the temperature which have been changed are kept constant are conducted by one batch operation of polymerization reaction.

[5] The process for producing an ethylene-vinyl alcohol copolymer according to above [4], wherein in the intermediate reaction, the ethylene pressure is continuously changed at a rate of change of 25-80 kg/cm²·hr.

[6] The process for producing an ethylene-vinyl alcohol copolymer according to above [4] or [5], wherein in the intermediate reaction, the ethylene pressure and the temperature are continuously changed over a period of 15 minutes to 3 hours.

Incidentally, the process for polymerizing ethylene and vinyl acetate described in Patent Document 1, that is, the process in which the ethylene pressure and/or the temperature is changed stepwise, yields a copolymer which, when examined by liquid chromatography, gives an ethylene content distribution curve, which shows a distribution of ethylene contents, that includes no components having ethylene contents corresponding to between a highest peak and a second highest peak, because of the stepwise change. This copolymer cannot produce the effects of the present invention.

The present invention furthermore provides a laminate including the ethylene-vinyl alcohol copolymer.

[7] A laminate including at least one layer comprising:

the ethylene-vinyl alcohol copolymer according to above [1] or [2].

Effects of the Invention

Since the EVOH of the present invention has an ethylene content distribution which satisfies specific requirements, this EVOH has the effect of being excellent in terms of melt moldability and of gas barrier property and formability. This EVOH is useful in various applications including films, sheets, containers, and fibers.

BRIEF DESCRIPTION OF THE DRAWINGS

FIG. 1 is a schematic view of a chart of an ethylene content distribution curve obtained by an examination by liquid chromatography, the curve indicating a distribution of ethylene contents.

FIG. 2 is a chart of an ethylene content distribution curve of the EVOH obtained in Example 1, the curve being obtained by an examination by liquid chromatography and indicating a distribution of ethylene contents.

FIG. 3 is a chart of an ethylene content distribution curve of the EVOH obtained in Example 2, the curve being obtained by an examination by liquid chromatography and indicating a distribution of ethylene contents.

FIG. 4 is a chart of an ethylene content distribution curve of the EVOH obtained in Comparative Example 1, the curve being obtained by an examination by liquid chromatography and indicating a distribution of ethylene contents.

FIG. 5 is a chart of an ethylene content distribution curve of the EVOH obtained in. Comparative Example 2, the curve being obtained by an examination by liquid chromatography and indicating a distribution of ethylene contents.

MODES FOR CARRYING OUT THE INVENTION

The present invention is explained below in detail.

The EVOH of the invention is characterized in that when examined by liquid chromatography, the EVOH gives an ethylene content distribution curve that has at least two peaks and that satisfies the following [I] to [IV]. The ethylene content distribution curve is a curve which indicates a distribution of ethylene contents. The larger the height of a peak, the higher the content of a component which has the ethylene content. Meanwhile, the proportion of the component(s) having ethylene content(s) within a specific range to the whole copolymer is defined as the proportion of the area of the peak corresponding to ethylene contents corresponding to the specific range to the total area of all the peaks. The term "ethylene content for a peak" means the value of abscissa (ethylene content) at the point the base line where a line perpendicular thereto has been drawn from the top of the peak.

[I] An ethylene content (a) of a component which shows a highest peak (A) is 20-35% by mole.

[II] An ethylene content (b) of a component which shows a second highest peak (B) is 45-60% by mole.

[III] When the abscissa ranging from the peak (A) to the peak (B) is divided into four equal parts, then a proportion (v) of component(s) (V) which has ethylene content (w) corresponding to the two regions (W) having therebetween a center (C) that lies midway between the peak (A) and the peak (B) to the whole copolymer is 5-25% by weight.

[IV] A maximum value of the ordinate in the two regions (W) is not larger than two times an average value of the ordinate in the two regions (W).

In this description, each "–" used for indicating a numerical range means that the numerical values which precede and succeed the "–" are included in the range as a lower limit and an upper limit.

In the present invention, [I] above means that a component having a relatively low ethylene content is contained in a large amount to thereby make the EVOH have high gas barrier properties. The ethylene content (a) of the component which shows a highest peak (A) is in the range of 20-35% by mole, preferably 22-33% by mole, especially preferably 25-32% by mole. In case where the ethylene content (a) is too low, the melt moidability decreases. In case where the ethylene content (a) is too high, the gas barrier properties decrease.

In the present invention, [II] above means that a component having a relatively high ethylene content is contained to thereby make the EVOH have satisfactory secondary formability. The ethylene content (b) of the component which shows a second highest peak (B) is in the range of 45-60% by mole, preferably 46-58% by mole, especially preferably 48-55% by mole. In case where the ethylene content (b) is too low, the secondary formability decreases. In case where the ethylene content (h) is too high, the melt moldability decreases.

In the present invention, [III] above means that component(s) which has ethylene content between the component having a relatively low ethylene content and the component having a relatively high ethylene content are contained in a certain amount to thereby make the resin composition (EVOH) have satisfactory melt moldability. The proportion (v) of component(s) (V) Which has ethylene content(s) (w) corresponding to the two regions (W) to the whole copolymer is in the range of 5-25% by weight, preferably 8-20% by weight, especially preferably 10-15% by weight. In ease where the proportion thereof is lower than that range, the melt moldability is insufficient. In case where the proportion thereof is higher than that range, the gas barrier properties are insufficient.

In the present invention, [IV] above means that the component(s) which has ethylene content between the component having a relatively low ethylene content and the component having a relatively high ethylene content do not include a large amount of a component having a specific ethylene content but are components which have a wide ethylene content distribution, and that the resin composition (EVOH) hence has better melt moldability. In the two regions (W), a maximum value of the ordinate is not larger than two times an average value of the ordinate in the two regions (W), and is especially preferably 1-1.8 times the average value thereof. In case where that value is too large, the melt moldability is insufficient.

In the EVOH of the invention, the difference between the ethylene content (a) and the ethylene content (b) is preferably 10-30% by mole, especially preferably 15-25% by mole. In case where the difference is smaller than the lower limit, the gas barrier properties and the secondary formability tend to decrease. In case where the difference is larger than the upper limit, the melt moldability tends to decrease.

In the EVOH of the invention, the average ethylene content is preferably 25-50% by mole, especially preferably 30-45% by mole. In case where the average ethylene content thereof is too low, the EVOH tends to have high a melting point and reduced melt moldability. In case where the average ethylene content thereof is too high, the gas barrier properties tend to decrease.

The average ethylene content is a value determined from a distribution curve obtained by an examination by liquid chromatography, by determining the proportion (percentage) of each of components sorted by ethylene content (according to the minimum data acquisition interval in the liquid chromatography), calculating the product of each ethylene content and the proportion of the corresponding component, and dividing the sum of these products by 100.

In the present invention, with respect to ethylene contents of the EVOH, an ethylene content distribution curve, which indicates a distribution of ethylene contents, is determined by liquid chromatography to thereby examine the requirements.

FIG. 1 is a schematic view of an ethylene content distribution curve obtained by liquid chromatography. Peak (A), peak (B), center (C), and regions (W) are as shown in FIG. 1. However, peak (A) and peak (B) are each a value corresponding to the point to which a perpendicular has been dropped from the top of the peak. The center (C) is the center of the ethylene contents (abscissa) between the peak (A) and the peak (B) which have been divided into four equal regions. The term "regions (W)" means the two regions which have the center (C) therebetween (i.e., the two central regions) of the four regions.

A liquid chromatograph is configured of a degasser, a pump unit, an autosampler, a column oven, and a detector. A column for liquid chromatography is attached to the apparatus configured of these units, and a sample is separated while sending one or more solvents. In an examination for determining a polymer composition distribution, two or more solvents are used to examine the sample in the gradient mode in which the mixing ratio therebetween is changed with time. As a detector for the liquid chromatography, it is preferred to select an evaporative light scattering detector which is capable of detecting non-volatile substances such as polymers.

In the present invention, a measurement can be made, for example, by the following method.

An evaporative light scattering detector (ELSD) ("PL-ELS 1000", manufactured by Polymer Laboratories Ltd.) is attached to a high performance liquid chromatography ("LC-10ADvp", manufactured by Shimadzu Corp.). Products of EVOH re-acetylation (ethylene-vinyl acetate copolymers) are examined for copolymer composition distribution.

This examination is conducted at a mobile-phase flow rate of 0.5 mL/min using a gradient system in which two solvents A and B are used. Solvent A is a solvent obtained by mixing acetonitrile and water in a volume ratio of 90:10, while solvent B is tetrahydrofuran. The solvent gradient is one in which the mixing ratio between solvent A and solvent B is linearly changed with time so that the content of solvent A is 100%© at initiation of the measurement and is 40% at 60 minutes after the measurement initiation. Solvent A is used as the solvent of the sample solution to regulate the sample concentration to about 1 mg/mL. The injection amount is 100 μL. As the column is used one column of C18 Column ("GL-Pack Nucleosil C18-100", manufactured by GL Science Inc.), which is a reverse-phase column. The temperature of the column is set at 40° C. The evaporative light scattering detector (ELSD) is operated under the conditions of a teed gas (nitrogen gas) amount of 1.0 L, a nebulizer temperature of 40° C., and an evaporator temperature of 70° C. Data are acquired from the detector at an interval of 1.2 seconds, and all the data are acquired at this interval during the measurement. Intervals at which data are to be acquired from the detector are not limited to that. However, for accurately determining an ethylene content distribution curve, it is necessary to acquire the data at a regular interval of 10 seconds or less and to set the data acquisition interval so that after an ethylene content distribution curve is obtained by the following method, the data interval with respect to ethylene content is 0.1% by mole or less throughout the whole data range.

By the procedure described above, data on liquid chromatogram can be obtained. However, since the intensity for the detection by the ELSD is not proportional to concentration, it is necessary to make a correction regarding the sensitivity of the detector. The sensitivity correction is conducted in the following manner.

Two different products of EVOH re-acetylation each having an ethylene composition of at least 5% by mole are used. Solutions of each re-acetylation product which respectively have four concentrations ranging from 0.1 to 1.5 mg/mL (the concentrations differ at a regular interval) are examined to obtain chromatograms. Thereafter, the intensities of each chromatogram from which the base line has been removed are used to determine a correction factor f. A method for determining the correction factor f is as follows. The intensities at respective points of the chromatogram from which the base line has been removed are each divided by constant a and multiplied by 1/f, and the resultant values for the respective intensities are summed up. Furthermore, the sum is divided by the concentration, and constant c is subtracted therefrom. The resultant value is squared. Such squares for the respective concentrations of each sample are summed up. This sum is determined so as to be minimum, and the minimum value is taken as the correction factor.

With respect to the constants a and c, any values may be selected in the beginning of the calculations, and are determined at the time when the sum determined by the calculations has become minimum. Constant c may be a positive integer.

Next, a calibration curve for converting elution time into copolymer composition is drawn. When drawing the calibration curve, five samples each having a known average ethylene composition determined by NMR spectroscopy (the average ethylene compositions preferably differ by 2% by mole or more) are examined, and the raw chromatograms obtained are subjected to a sensitivity correction. With respect to the corrected chromatograms, the relationship between elution time and copolymer composition is regarded as akin to quadratic function, and the product of the intensity fraction and the copolymer composition for each point is calculated. The difference between the sum of such products and the copolymer composition determined by NMR is squared. Using the coefficients of quadratic function which render the square minimum, each elution time is converted to a copolymer composition.

A differential distribution curve is obtained by the procedure shown above to determine the distributions of ethylene contents in the products of EVOH re-acetylation (ethylene-vinyl acetate copolymers).

Examples of methods usable for obtaining the EVOH of the invention include:
(1) a method in which an EVOH having an ethylene content of (a), an EVOH having an ethylene content of (b), and a plurality of EVOHs having ethylene contents intermediate between (a) and (b) are mixed together in small amounts; and
(2) a method in which an EVOH having an average ethylene content of (a) and having a specific wide ethylene content distribution and an EVOH having an average ethylene content of (b) and having a specific wide ethylene content distribution are mixed together.

However, from the standpoint of obtaining an EVOH which as a whole is even and has satisfactory melt moldability, a preferred process is one in which
(3) reaction conditions are continuously changed when conducting a copolymerization reaction of ethylene with vinyl ester compound, in particular, a copolymerization reaction of ethylene with vinyl acetate.

The process (3) is explained below in detail.

In the present invention, it is preferable that the process should be one comprising, copolymerizing ethylene with a vinyl ester compound in a solvent to obtain an ethylene-vinyl ester copolymer and that further saponifying the ethylene-vinyl ester copolymer to produce an EVOH, wherein the copolymerization reaction between the ethylene and the vinyl ester compound is conducted while continuously changing the ethylene pressure.

Specifically, a copolymerization reaction of ethylene with a vinyl ester compound is conducted in a manner in which a preceding reaction for polymerizing the monomers while keeping an ethylene pressure constant, preferably while keeping an ethylene pressure and a temperature constant, an intermediate reaction for polymerizing the monomers while the ethylene pressure, preferably the ethylene pressure and the temperature, is being changed continuously over a time period, and a later-stage reaction for polymerizing the monomers while the ethylene pressure is kept constant, preferably the ethylene pressure after the ethylene pressure and the temperature have been changed is kept constant, preferably while the ethylene pressure and the temperature which have been changed are kept constant, are conducted by one batch operation of polymerization reaction. This process is capable of efficiently yielding the EVOH of the invention and is more preferred.

In the preceding reaction, the ethylene pressure is preferably 20-45 kg/cm$^2$, especially preferably 23-42 kg/cm$^2$, more preferably 25-40 kg/cm$^2$. In case where the ethylene pressure is too low, the melt moldability tends to decrease. In ease where the ethylene pressure is too high, the gas barrier properties tend to decrease.

The temperature is preferably 50-80° C., especially preferably 53-77° C., more preferably 55-75° C. In case where the temperature is too low, the efficiency of polymerization tends to decrease, resulting in a prolonged polymerization period or rendering the polymerization less apt to proceed. In case where the temperature is too high, the polymerization tends to be difficult to control.

The reaction time is preferably 30 minutes to 4 hours, especially preferably 1-3 hours. In case where the reaction time is too short, there is a tendency that the amount of low-ethylene-content components becomes insufficient, resulting in a decrease in gas barrier property. In case where the reaction time is too long, there is a tendency that the amount of low-ethylene-content components becomes too large, resulting in a decrease in secondary formability.

In the intermediate reaction, the monomers are polymerized while continuously changing the ethylene pressure, preferably the ethylene pressure and the temperature, over a time period, preferably over 15 minutes to 3 hours, especially preferably over 30 minutes to 1 hour. In case where this period is too short, there is a tendency that the proportion (v) of component(s) (V) which has ethylene content(s) (w) corresponding to the regions (W) to the whole copolymer is too small, resulting in a decrease in melt moldability. In case where the period is too long, there is a tendency that the proportion (v) is too large, resulting in a decrease in gas barrier property.

In the intermediate reaction, it is preferred to continuously elevate the ethylene pressure at a rate of change of 25-80 kg/cm$^2$·hr. An especially preferred rate of change is 28-75 kg/cm$^2$·hr, and a more preferred rate of change is 30-70 kg/cm$^2$·hr. In case where the rate of change is too low, there is a tendency that the proportion (v) of component(s) (V) which has ethylene content(s) (w) corresponding to the regions (W) to the whole copolymer is too large, resulting in a decrease in gas barrier property. In case where the rate of change is too high, the proportion (v) tends to be too small, resulting in a decrease in melt moldability Furthermore, in the intermediate reaction, it is preferred to lower the temperature at a rate of change of 2-40° C./hr. An especially preferred rate of change is 3-35° C./hr, and a more preferred rate of change is 5-30° C./hr. In case where the rate of change is too low, there is a tendency that the proportion (v) of component(s) (V) which has ethylene content(s) (w) corresponding to the regions (W) to the whole copolymer is too large, resulting in a decrease in gas barrier property. In case where the rate of change is too high, the proportion (v) tends to be too small, resulting in a decrease in melt moldability.

In the later-stage reaction, the ethylene pressure is preferably 45-80 kg/cm$^2$, especially preferably 48-77 kg/cm$^2$, more preferably 50-75 kg/cm$^2$. In ease where the ethylene pressure is too low, the secondary formability tends to decrease. In case Where the ethylene pressure is too high, the gas barrier properties tend to decrease.

The temperature is preferably 45-75° C., especially preferably 48-72° C., more preferably 50-70° C. In case where the temperature is too low, the efficiency of polymerization tends to decrease, resulting in a prolonged polymerization period or rendering the polymerization less apt to proceed. In case where the temperature is too high, the polymerization tends to be difficult to control.

The reaction time is preferably 30 minutes to 4 hours, especially preferably 1-3 hours. In case where the reaction time is too short, there is a tendency that the amount of high-ethylene-content components becomes insufficient, resulting in a decrease in secondary formability. In case where the reaction time is too long, there is a tendency that the amount of high-ethylene-content components becomes too large, resulting in a decrease in gas barrier property.

In the present invention, the total time period of the series of polymerization reactions is usually preferably 2-11 hours, especially preferably 3-10 hours, more preferably 4-9 hours. In case where the total time period of the polymerization reactions is too short, the polymerization tends to be difficult to control. In case where the total time period thereof is too long, the production efficiency tends to decrease.

For polymerizing ethylene and a vinyl ester compound in a solvent, use can be made of a method such as, for example, solution polymerization, bulk polymerization, suspension polymerization, or emulsion polymerization. However, solution polymerization is suitable when production efficiency in the later step for saponifying the ethylene-vinyl ester copolymer is taken into account.

Preferred examples of solvents usable in the solution polymerization include an alcohol having 4 or more carbon atoms or a mixed solvent including an alcohol having 4 or more carbon atoms as a main component. Examples of the alcohol include methanol, ethanol, and propanol. Methanol is especially preferred.

The amount of the solvent, per 100 parts by weight of the vinyl ester compound, is preferably 1-80 parts by weight, especially preferably 1-70 parts by weight, more preferably 1-60 parts by weight.

A polymerization initiator is used for the polymerization. The polymerization initiator may be a radical initiator. Preferred examples thereof include: azo compounds such as 2,2'-azobis(2,4-dimethylvaleronitrile), 2,2'-azobis(2,4,4-trimethylvaleronitrile), 2,2'-azobisisobutyronitrile, 2,2'-azobis(4-methoxy-2,4-dimethylvaleronitrile), and dimethyl 2,2'-azobisisobutyrate; peroxyesters such as t-butyl peroxyneodecanoate, t-butyl peroxypivalate, t-butyl peroxy-2-ethylhexanoate, α,α'-bis(neodecanoylperoxy)diisopropyl-1,3,3-tetramethylbutyl peroxyneodecanoate, 1-cyclohexyl-1-methylethyl peroxyneodecanoate, t-hexyl peroxyneodecanoate, t-butyl, peroxyisobutyrate, and t-hexyl peroxypivalate; peroxydicarbonates such as di-n-butyl peroxydicarbonate, bis(4-t-butylcyclohexyl) peroxydicarbonate, dicyclohexyl peroxydicarbonate, bis(2-ethylhexyl)di-sec-butyl peroxydicarbonate, di-n-propyl peroxydicarbonate, diisopropyl peroxydicarbonate, di-sec-butyl peroxydicarbonate, bis(4-t-butylcyclohexyl) peroxydicarbonate, di-2-ethoxyethyl peroxydicarbonate, di(2-ethylhexyl) peroxydicarbonate, dimethoxybutyl peroxydicarbonate, and di(3-methyl-3-methoxybutyl peroxydicarbonate; and diacyl peroxides such as dibenzoyl peroxide, distearoyl peroxide, dilauroyl peroxide, dioctanoyl peroxide, didecanoyl peroxide, 3,3,5-trimethylhexanoyl peroxide, diisobutyl peroxide, dipropyl peroxide, and diacetyl peroxide.

The amount of the polymerization initiator to be used, per 100 parts by weight of the vinyl ester compound, is preferably 0.002-0.1 part by weight, especially preferably 0.004-0.06 parts by weight. In case where the use amount thereof is too small, the efficiency of polymerization tends to decrease, resulting in a prolonged polymerization period or rendering the polymerization less apt to proceed. In case where the use amount thereof is too large, there is a possibility that the polymerization might be difficult to control or that the initiator might remain after completion of the polymerization to cause post-polymerization.

It is preferable that the vinyl ester compound should be any of fatty acid vinyl ester compounds. It is more preferred to representatively use vinyl acetate among these. Also usable besides vinyl acetate are, for example, vinyl formate, vinyl propionate, vinyl valerate, vinyl butyrate, vinyl isobutyrate, vinyl pivalate, vinyl caprate, vinyl laurate, vinyl stearate, vinyl benzoate, and Vinyl Versatate. Any one of these may be used alone, or two or more thereof may be used in combination.

In the present invention, ethylenically unsaturated copolymerizable monomers may have been copolymerized, besides ethylene and the vinyl ester compound, so long as the properties required of the EVOH are not impaired thereby. Examples of the monomers are as follows.

Examples thereof include olefins such as propylene, 1-butene, and isobutene, hydroxy-containing α-olefins such as 2-propen-1-ol, 3-buten-1-ol, 4-penten-1-ol, 5-hexen-1-ol, 3,4-dihydroxy-1-butene, and 5-hexene-1,2-diol, and esters thereof such as 3,4-diacyloxy-1-butenes, in particular, 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether.

Examples thereof further include unsaturated acids such as acrylic acid, methacrylic acid, crotonic acid, phthalic acid (anhydride), maleic acid (anhydride), and itaconic acid (anhydride), slats of these acids, and monoalkyl esters or dialkyl esters thereof having 1-18 carbon atoms.

Examples thereof furthermore include: acrylamide compounds such as acrylamide, N-alkylacrylamides having 1-18 carbon atoms, N,N-dimethylacrylamide, 2-acrylamidopropanesulfonic acid or salts thereof, and acrylamidopropyldimethylamine or acid salts or quaternary salts thereof; and methacryhunide compounds such as methacrylamide, N-alkylmethacrylamides having 1-18 carbon atoms, N,N-dimethylmethacrylamide, 2-methacrylamidopropanesulfonic acid or salts thereof, and methacrylamidopropyldimethylamine or acid salts or quaternary salts thereof.

Examples thereof still further include N-vinylamides such as N-vinylpyrr idone, N-vinylformamide, and N-vinylacetamide, vinyl cyanide compounds such as acrylonitrile and methacrylonitrile, vinyl ethers such as alkyl vinyl ethers having 1-18 carbon atoms, hydroxyalkyl vinyl ethers, and alkoxyalkyl vinyl ethers, vinyl halide compounds such as vinyl chloride, vinylidene chloride, vinyl fluoride, vinylidene fluoride, and vinyl bromide, vinylsilanes such as trimethoxyvinylsilnae, and other monomers including allyl acetate, ally chloride, trimethyl(3-acrylamido-3-dimethylpropyl)ammonium chloride, acrylamido-2-methylpropanesulfonic acid, vinylethylene carbonate, and glycerin monoallyl ether.

The ethylene-vinyl ester copolymer thus obtained is subjected, according to need, to removal of the unreacted vinyl ester compound therefrom, and is then saponified.

The removal of the unreacted vinyl ester compound is conducted so that the content of the residual vinyl ester compound is reduced to preferably 0.1% by weight or less, more preferably 0.05% by weight or less.

The saponification may be conducted by any method which s usually and generally employed. For example, the saponification is conducted in a homogeneous system of an alcohol solvent, such as methanol, or in a heterogeneous system of a mixed solvent composed of an alcohol, such as methanol or ethanol, and water added thereto according to need, using an alkali metal compound, such as the hydroxide of sodium or potassium or an alkoxide or the like thereof, or an acid catalyst, such as hydrochloric acid, sulfuric acid, or acetic acid, as a saponification catalyst.

When performing the heterogeneous-system saponification, acetone, hydrazine, a long-chain alkylamine, or the like may be incorporated according to need in order to prevent coloring.

In the present invention, the degree of saponification of the vinyl ester compound in the EVOH obtained by the saponification is preferably 80-100% by mole, especially preferably 90-100% by mole, more preferably 95-100% by mole. In case where the degree of saponification thereof is too low, this EVOH tends to show reduced thermal stability when melt-molded and the molded objects obtained tend to have reduced mechanical strength and reduced gas barrier properties.

Thus, the EVOH of the invention is obtained. Although this EVOH can be subjected as such to various purposes, it is usually preferable that the EVOH obtained by the saponification should be formed into pellets and then subjected to various purposes.

For forming the EVOH into pellets, a known method can be employed. For example, use may be made of a method in which the solution of the EVOH in a mixed solvent composed of water and an alcohol is extruded, in the form of strands or a sheet, into a coagulating liquid and the strands or sheet obtained is cut into pellets.

With respect to the shape of such EVOH pellets, cylindrical or spherical pellets and the like are preferred. In the case of cylindrical pellets, the diameter is preferably 1-10 mm and the length is preferably 1-10 mm. In the case of spherical pellets, the diameter is preferably 1-10 mm.

An alkali metal, alkaline earth metal, boric acid, phosphoric acid, or the like may be incorporated into the EVOH for the purpose of imparting thermal stability or adhesiveness. In this case, it is preferable that the EVOH should have a microporous internal structure having evenly distributed pores therein that have diameters of about 0.1-10 μm, from the standpoint that this structure enables any of those substances to be evenly incorporated. Usually, an EVOH having that structure can be obtained by suitably regulating the following and other conditions when extruding an EVOH solution (for example, in a water/alcohol mixed solvent) into a coagulating bath: the concentration of the EVOH solution (e.g., 20-80% by weight), extrusion temperature (e.g., 45-70° C.), kind of the solvent (e.g., water/alcohol mixing ratio by weight=80/20 to 5/95, etc.), temperature of the coagulating bath (e.g., 1-20° C.), residence time (e.g., 0.25-30 hours), and EVOH amount in the coagulating bath (e.g., 0.02-2% by weight).

Furthermore, it is preferable that the EVOH should have a water content of 20-80% by weight, from the standpoint that those and other compounds can be evenly and rapidly incorporated thereinto. The amount of the compound to be incorporated can be regulated by controlling the concentration of an aqueous solution of the substance, period of a contact treatment with the aqueous solution, temperature in the contact treatment, stirring speed in the contact treatment, water content of the EVOH to be treated, etc., in the contact treatment with the solution.

Examples of the alkali metal and the alkaline earth metal include sodium, potassium, calcium, magnesium, and the like. Preferred of these are sodium, potassium, calcium, and magnesium. When incorporating these metals, it is possible to incorporate these metals as the metal salts of a fatty acid, such as acetic acid or stearic acid, or of an inorganic acid, such as phosphoric acid. When incorporating phosphoric acid, use can be made of not only a phosphoric acid salt with any of the alkali metals or alkaline earth metals shown above but also a hydrogen phosphate salt or phosphoric acid. Besides the alkali metals and alkaline earth metals shown above, transition metals may be incorporated, such as manganese, copper, cobalt, and zinc. Of these, zinc is preferred.

The EVOH in the form of pellets thus obtained is usually dried after the contact treatment.

For the drying, various drying methods can be employed. Examples thereof include: fluidized drying in which the EVOH substantially in a pellet form is dried while being stirred and dispersed mechanically or by hot air; and stationary drying in which the EVOH substantially in a pellet form is dried without undergoing any dynamic action such as stirring or dispersing. Examples of dryers for performing the fluidized drying include a cylindrical/trough stirring dryer, tubular dryer, rotary dryer, fluidized-bed dryer, vibrating fluidized-bed dryer, and conical rotary dryer. Examples of dryers for performing the stationary drying include a batch tray dryer, as a dryer of the type in which the material is allowed to stand still, and a band dryer, tunnel dryer, and vertical dryer, as dryers of the material transfer type. However, usable dryers are not limited to these examples. It is also possible to conduct fluidized drying and stationary drying in combination.

As a heating gas for the drying, it is preferred to use air or an inert gas (nitrogen gas, helium gas, argon gas, etc.). The temperature of the heating gas is preferably 40-1.50° C., from the standpoints of production efficiency and prevention of the thermal deterioration of the EVOH. The time period of the drying depends on the water content of the EVOH and the amount of the EVOH to be dried, but is usually preferably about 15 minutes to 72 hours from the standpoints of production efficiency and prevention of the thermal deterioration of the EVOH.

Although the EVOH is dried under these conditions, the water content of the dried EVOH is preferably 0.001-5% by weight, especially preferably 0.01-2% by weight, more preferably 0.1-1% by weight. In case where the water content thereof is too low, the long-run moldability tends to decrease. In case where the water content thereof is too high, the EVOH tends to foam during extrusion molding.

The melt flow rate (MFR) (210° C.; load, 2,160 g) of the EVOH of the invention is usually preferably 0.1-100 g/10 min, especially preferably 0.5-50 g/10 min, more preferably 1-30 g/10 min. In case where the melt flow rate thereof is too low, there is a tendency that the inside of the extruder during molding is in a high-torque state, making the extrusion difficult. In case where the melt flow rate thereof is too high, there is a tendency that stretch forming with heating results in decreases in appearance and gas barrier property.

The MFR of the EVOH may be regulated by regulating the degree of polymerization thereof. It is also possible to regulate the MFR thereof by adding a crosslinking agent or a plasticizer.

In the present invention, the following ingredients may be incorporated into the EVOH to be obtained, so long as the incorporation thereof does not defeat the object of the invention: lubricants such as saturated aliphatic amides (e.g., stearamide), unsaturated fatty acid amides (e.g., oleamide), bis(fatty acid) amides (e.g., ethylenebisstearamide), fatty acid metal salts (e.g., calcium stearate and magnesium stearate), and low-molecular-weight polyolefins low-molecular-weight polyethylene or low-molecular-weight polypropylene having a molecular weight of about 500-10,000), inorganic salts (e.g., hydrotalcite), plasticizers (e.g., aliphatic polyhydric alcohols such as ethylene glycol, glycerin, and hexanediol), oxygen absorbers (e.g., inorganic oxygen absorbers such as reduced-iron powders, mixtures of a reduced-iron powder with a water-absorbing substance, electrolyte, or the like, aluminum powder, potassium sulfite, and photocatalyst titanium oxide; organic-compound oxygen absorbers such as ascorbic acid and fatty acid esters or metal salts thereof; polyhydric phenols such as hydroquinone, gallic acid, and hydroxyl-containing phenol aldehyde resins, coordination compounds including a nitrogen-containing compound and a transition metal, such as bissalicylaldehyde-imine cobalt, tetraethylenepentatnine cobalt, a cobalt/Schiff base complex, porphyrins, macrocyclic polyamine complexes, and polyethyleneimine/cobalt complexes, terpene compounds, products of reaction between an amino acid and a hydroxyl-containing reducing substance, and triphenylmethyl compounds; polymeric oxygen absorbers such as coordination compounds including a nitrogen-containing resin and a transition metal (e.g., a combination of MXD nylon and cobalt), blends of a resin containing tertiary hydrogen atoms with a transition metal (e.g., a combination of polypropylene and cobalt), blends of a resin containing carbon-carbon unsaturated bonds with a transition metal (e.g., a combination of polybutadiene and cobalt), resins which are oxidizable and disintegrable by light (e.g., polyketones), and anthraquinone polymers (e.g., polyvinylanthraquinone); and mixtures obtained by adding a photoinitiator (e.g., benzophenone), a peroxide scavenger (e.g., commercial antioxidants), a deodorant (e.g., activated carbon) to those blends), heat stabilizers, light stabilizers, antioxidants, ultraviolet absorbers, colorants, antistatic agents, surfactants, antibacterials, antiblocking agents, slip agents, fillers (e.g., inorganic fillers), and other resins (e.g., polyolefins and polyamides).

The EVOH of the invention thus obtained can be applied to various molded or formed objects. Such molded or formed objects which can be practically used include a single-layer film including the EVOH of the invention and a laminate including at least one layer which includes the EVOH.

The laminate is explained below.

When producing the laminate of the invention, another base material (e.g., a thermoplastic resin) is laminated to one or each surface of a layer including the EVOH of the invention. Examples of laminating methods include: a method in which another base material is laminated to a film, sheet, or the like including the EVOH of the invention by melt-extrusion laminating; a method in which, conversely, the EVOH of the invention is laminated to another base material by melt-extrusion laminating; a method in which the EVOH of the invention and another base material are co-extruded; and a method in which the EVOH (layer) of the invention and another base material (layer) are dry-laminated to each other using a known adhesive such as an organotitanium compound, isocyanate compound, polyester compound, or polyurethane compound. A melt molding temperature for the melt extrusion frequently selected from the range of 150-300° C.

Useful as said another base material is a thermoplastic resin. Examples thereof include olefin homopolymers or copolymers, such as linear low-density polyethylene, low-density polyethylene, ultralow-density polyethylene, medium-density polyethylene, high-density polyethylene, ethylene-vinyl acetate copolymers, ionomers, ethylene-propylene (block and random) copolymers, ethylene-acrylic acid copolymers, ethylene-acrylic ester copolymers, polypropylene, propylene-α-olefin (α-olefin having 4-20 carbon atoms) copolymers, polybutene, and polypentene, and polyolefin resins in a broad sense, such as polyolefin resins obtained by graft-modifying these olefin homopolymers or copolymers with an unsaturated carboxylic acid or an ester thereof, and further include polyester resins, polyamide resins (including copolyamides), poly(vinyl chloride), poly (vinylidene chloride), acrylic resins, polystyrene, vinyl ester resins, polyester elastomers, polyurethane elastomers, chlorinated polyethylene, chlorinated polypropylene, aromatic or aliphatic polyketones, polyalcohols obtained by reducing these polyketones, and an EVOH which is not an EVOH that shows peak (A) or peak (B). Preferred of these, from the standpoint of the practical properties (especially strength) of the laminate, are polypropylene, ethylene-propylene (block or random) copolymers, polyamides, polyethylenes, ethylene-vinyl acetate copolymers, polystyrene, poly(ethylene terephthalate) (PET), and polyethylene naphthalate) (PEN).

In the case where a formed object, e.g., a film or a sheet, which includes the EVOH of the invention is coated with another base material by extrusion coating or where a film, sheet, or the like of another base material is laminated thereto using an adhesive, the base material to be used can be any desired base material (e.g., paper, a metal foil, a uni- or biaxially stretched plastic film or sheet, the plastic film or sheet coated with an inorganic substance by vapor deposition, woven fabric, nonwoven fabric, metal felt, or wood) besides the thermoplastic resins.

Layer configurations of the laminate are as follows. In cases when a layer including the EVOH of the invention is expressed by α (α1, α2, . . . ) and a layer of another base material, e.g., a thermoplastic resin, is expressed by β (β1, β2, . . . ), then configurations in which layer α is the innermost layer are possible. Such configurations include not only the two-layer structure of [inside] α/β [outside] (the same applies hereinbelow), but also any desired combinations including, for example, α/β/α, α1/α2/β, α/β1/β2, α1/β1/α2/β2, and α1/β1/β2/α2/β2/β1. Furthermore, in cases when a regrind layer constituted of a mixture of at least an EVOH and a thermoplastic resin is expressed by R, possible configurations include, for example, α/R/β, α/R/α/ β, α/β/R/α/R/β, α/β/α/R/α/β, and α/β/R/α/R/α/R/β.

In the layer configurations shown above, a layer of an adhesive resin can be disposed between the layers according to need. As the adhesive resin, use can be made of various adhesive resins. Use of various adhesive resins is preferred from the standpoint of obtaining laminates having excellent stretchability. Although suitable adhesive resins vary depending on the kind of the resin of β and cannot be specified unconditionally, examples of the adhesive resins include a carboxyl-containing modified olefin polymer obtained by chemically bonding an unsaturated carboxylic acid or the anhydride thereof to an olefin polymer (a polyolefin resin in the broad sense) by addition reaction, graft reaction, etc.

Specifically, suitable examples thereof include one polymer selected from among the following or a mixture of two or more polymers selected from the following: polyethylene graft-modified with maleic anhydride, polypropylene graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, and the like. The amount of the unsaturated carboxylic acid or anhydride thereof contained in this thermoplastic resin is preferably 0.001-3% by weight, more preferably 0.01-1% by weight, especially preferably 0.03-0.5% by weight. In case where the modification amount in the modified resin is too small, the adhesiveness tends to decrease. Conversely, in case where the amount thereof is too large, there is a tendency that a crosslinking reaction occurs, resulting in a decrease in moldability.

These adhesive resins can be blended with the EVOH of the invention, another EVOH, or a rubber or elastomer ingredient such as polyisobutylene or an ethylene-propylene rubber, or with the resin of layer etc. In particular, blending with a polyolefin resin different from the polyolefin resin used as the base of the adhesive resin is useful because this blending may improve the adhesiveness.

The thicknesses of the layers of the laminate vary depending on the layer configuration, kind of the β-layer resin, uses, container form, required properties, etc., and cannot be unconditionally specified. Usually, however, the thickness of layer α is selected from the range of preferably about 5-500 μm, more preferably about 10-200 μm, the thickness of layer β is selected from the range of preferably about 10-5,000 μm, more preferably about 30-1,000 μm, and the thickness of the adhesive-resin layer is selected from the range of preferably about 5-400 μm, more preferably about 10-150 μm.

The laminate is usable as such in applications of various shapes. It is, however, preferred to subject the laminate to a hot stretching treatment in order to further improve the properties of the laminate. The term "hot stretching treatment" herein means an operation in which a laminate in the form of a film, sheet, or parison that has been evenly heated thermally is evenly formed into the shape of a cup, tray, tube, or film by means of chucks, a plug, vacuum, air pressure, blowing, etc. This stretching may be either uniaxial stretching or biaxial stretching. Stretching performed at a stretch ratio as high as possible is preferred from the standpoint of obtaining a stretch-formed object which has satisfactory physical properties and which has no defects due to stretching, such as pinholes, cracks, stretching unevenness, thickness unevenness, delamination, etc., and has excellent gas barrier properties.

As a stretching method, use can be made of one which is high in stretch ratio and is selected from among a roll stretching method, tenter stretching method, tubular stretching method, stretch blowing method, vacuum/air-pressure forming, and the like. In the case of biaxial stretching, either a simultaneous biaxial stretching mode or a sequential biaxial stretching mode can be employed. The stretching temperature is selected from the range of preferably about 60-170° C., more preferably about 80-160° C. It is preferable that after completion of the stretching, thermal fixing should be successively performed. The thermal fixing can be conducted by a known means, and the stretched film is heat-treated at preferably 80-170° C., more preferably 100-160° C., for about 2-600 seconds while keeping the film in the stretched state.

In the case where the laminate is for use as heat-shrinkable packaging materials for raw meat, processed meat, cheese, etc., the laminate is not subjected to the thermal fixing after the stretching and is used, as such, as a product film in such a manner that the raw meat, processed meat, cheese, or the like is wrapped with the film and the film is then heat-treated preferably at 50-130° C., more preferably at 70-120° C., for about 2-300 seconds, thereby heat-shrinking the film to attain tight packaging.

The laminate thus obtained may have any desired shape. Examples thereof include film, sheet, tape, and extrudates having other various cross-sectional shapes. The laminate obtained can be subjected, according to need, to a heat treatment, cooling, rolling, printing, dry laminating, coating with a solution or melt, processing for bag formation, deep drawing, processing for box formation, processing for tube formation, splitting, etc.

The thus-obtained containers each including a cup, tray, tube, or the like or the thus-obtained bags or covers each including a stretched film are useful as various kinds of packaging materials for foods, beverages, medicines, cosmetics, industrial chemicals, detergents, agricultural chemicals, fuels, etc.

EXAMPLES

The present invention is explained below in more detail by reference to Examples, but the invention should not be construed as being limited to the following Examples unless the invention departs from the spirit thereof.

In the Examples and Comparative Examples, "parts" and "%" are by weight.

The following properties were determined in the following manners.

(Determination of Ethylene Content Distribution)

An evaporative light scattering detector (ELSD) ("PL-ELS 1000", manufactured by Polymer Laboratories Ltd.) was attached to a high performance liquid chromatography ("LC-10ADvp", manufactured by Shimadzu Corp.). Products of EVOH re-acetylation (ethylene-vinyl acetate copolymers) were examined for copolymer composition distribution.

This examination was conducted at a mobile-phase flow rate of 0.5 mL/min usinjg a gradient system in which two solvents A and B were used as eluting solutions. Solvent A was a solvent obtained by mixing acetonitrile and water in a volume ratio of 90:10, while solvent B was tetrahydrofuran. The solvent gradient was one in which the mixing ratio between solvent A and solvent B was linearly changed with time so that the content of solvent A was 100% at initiation of the measurement and was 40% at 60 minutes after the measurement initiation. Solvent A was used as the solvent of the sample solution to regulate the sample concentration to about 1 mg/mL. The injection amount was 100 μL. As the column was used one column of C18 Column ("GI, Pack Nucleosil C18-100", manufactured by Science Inc.), which was a reverse-phase column. The temperature of the column was set at 40° C. The evaporative light scattering detector (ELSD) was operated under the conditions of a feed gas (nitrogen gas) amount of 1.0 L, a nebulizer temperature of 40° C., and an evaporator temperature of 70° C. Data were acquired from the detector at an interval of 1.2 seconds, and all the data were acquired at this interval during the measurement.

By the procedure described above, data on liquid chromatogram can be obtained. However, since the intensity for the detection by the ELSD is not proportional to concentration, it is necessary to make a correction regarding the sensitivity of the detector. The sensitivity correction was conducted in the following manner.

Two different products of EVOH re-acetylation each having an ethylene composition of at least 5% by mole were used. Solutions of each re-acetylation product which respectively had four concentrations ranging from 0.1 to 1.5 mg/mL (the concentrations differed at a regular interval) were examined to obtain chromatograms. Thereafter, the intensities of each chromatogram from which the base line had been removed were used to determine a correction factor f. The method for determining the correction factor f is as follows. The intensities at respective points of the chromatogram from which the base line had been removed were each divided by constant a and multiplied by 1/f, and the resultant values for the respective intensities were summed up. Furthermore, the sum was divided by the concentration, and constant c was subtracted therefrom. The resultant value was squared. Such squares for the respective concentrations of each sample were summed up. This sum was determined so as to be minimum, and the minimum value was taken as the correction factor.

With respect to the constants a and c, any values may be selected in the beginning of the calculations, and are determined at the time when the sum determined by the calculations has become minimum. Constant c may be a positive integer.

Next, a calibration curve for converting elution time into copolymer composition was drawn. When drawing the calibration curve, five samples each having a known average ethylene composition determined by NMR spectroscopy (the average ethylene compositions preferably differ by 2% by mole or more) were examined, and the raw chromatograms obtained were subjected to a sensitivity correction. With respect to the corrected chromatograms, the relationship between elution time and copolymer composition was regarded as akin to quadratic function, and the product of the intensity fraction and the copolymer composition for each point was calculated. The difference between the sum of such products and the copolymer composition determined by NMR was squared. Using the coefficients of quadratic function which rendered the square minimum, each elution time was converted to a copolymer composition.

A differential distribution curve was obtained by the procedure shown above to determine the distributions of ethylene contents in the products of EVOH re-acetylation (ethylene-vinyl acetate copolymers).

(Determination of Average Ethylene Composition and Average Degree of Saponification)

An EVOH was dissolved in deuterated dimethyl sulfoxide, and this solution was examined at 50° C. with a proton-NMR spectroscope ("DPX-400", manufactured by Bruker GmbH) to determine the average ethylene composition and the average degree of saponification.

Example 1

Into a 1-m$^3$ polymerization tank equipped with a cooling coil were introduced 340 kg of vinyl acetate, 85 kg of methanol, 70 g of t-butyl peroxyneodecanoate, and 10 g of citric acid. The system was temporarily replaced with nitrogen gas and then with ethylene, and ethylene was further forced into the polymerization tank until the ethylene pressure reached 35.5 kg/cm$^2$. While the contents were being stirred, the temperature was elevated to 67° C. and a polymerization reaction was conducted for 3 hours (preceding reaction). Subsequently, while the polymerization reaction was being continued, the reaction temperature was lowered at a constant rate from 67° C. to 60° C. and ethylene was continuously added at a constant rate until the ethylene pressure increased from 35.5 kg/cm$^2$ to 70 kg/cm$^2$, for 1 hour (intermediate reaction). Furthermore, the polymerization was continued for 1 hour while keeping the system in that state (later-stage reaction). Thus, the polymerization reaction was conducted for 5 hours in total. Thereafter, the polymerization reaction was terminated to obtain an ethylene-vinyl acetate copolymer.

Subsequently, the liquid reaction mixture containing the ethylene-vinyl acetate copolymer was supplied to a distillation column, and methanol vapor was introduced into a lower part of the column to thereby remove the unreacted vinyl acetate. Thus, a methanol solution of the ethylene-vinyl acetate copolymer was obtained.

A methanol solution containing sodium hydroxide in an amount of 0.008 equivalents to the residual acetic acid groups of the ethylene-vinyl acetate copolymer was supplied to the methanol solution of the copolymer to saponify the copolymer, thereby obtaining a methanol solution of an EVOH (EVOH, 30%; methanol, 70%). The acetyloxy moieties of this EVOH had a degree of saponification of 99.7% by mole.

The EVOH solution in methanol obtained was extruded in the form of strands into cold water, and the strands obtained (hydrous porous object) were cut with a cutter to obtain porous EVOH pellets having a diameter of 3.8 mm, a length of 4 mm, and a resin content of 35%.

The porous pellets obtained were washed with water until the sodium content was reduced to 0.07 parts per 100 parts of the EVOH. Thereafter, the pellets were immersed for 4 hours in 500 parts of water containing 0.27 parts of acetic acid, 0.033 parts (in terms of phosphorus amount) of phosphoric acid, 0.022 parts (in terms of phosphorus amount) of calcium phosphate, and 0.014 parts (in terms of boron amount) of boric acid per 100 parts of the EVOH. Subsequently, the porous pellets obtained were dried at 110° C. for 8 hours in a nitrogen stream having an oxygen concentration of 0.5% or less, thereby obtaining EVOH pellets which contained 0.16 parts of volatile matter, 0.02 parts of sodium, 0.012 parts (in terms of phosphorus amount) of phosphoric acid radicals, and 0.01 part (in terms of boron amount) of boric acid per 100 parts of the EVOH. This EVOH had an MFR of 4.7 g/10 min (210° C.; load, 2,160 g).

The EVOH obtained, when examined by liquid chromatography, gave an ethylene content distribution curve, which shows a distribution of ethylene contents, and two peaks were ascertained in the distribution curve (see FIG. 2).

The EVOH obtained was evaluated for gas barrier property, melt moldability, and secondary formability in the following manners.

<Formation of Single-layer Film>

The EVOH pellets obtained in Example 1 were fed to an extruder (shown below) equipped with a single-layer T-die to obtain a single-layer film in which portions around the center of the film had a thickness of 30 μm.

Extruder diameter: 40 mm
Screw shape: full-flighted
Screw compression ratio: 3.4
Screw rotation speed: 40 rpm
Die: coat hanger die
Die width: 450 mm
Maximum extruder temperature: 210° C.
Die temperature: 200° C.

(Gas Barrier Property)

The single-layer film obtained above was examined for oxygen permeability using an oxygen permeability measuring device ("OXTRAN 2/21", manufactured by MOCON Inc.) under the conditions of 20° C. and 65% RH. As the test gas, oxygen gas having a concentration of 100% was used. After completion of the measurement, the film thickness was measured and the determined oxygen permeability value was converted to one corresponding to 20-μm thickness. The unit is "cc·20 μm/m$^2$·day·atm".

(Stability in Film Formation (melt moldability))

The single-layer film obtained was examined for thickness at five portions in total, which were a transverse-direction central portion and four portions lying along the transverse direction from the central portion at an interval of 50 mm. The same thickness measurement was made on ten areas along the longitudinal direction. Thus, the thickness was measured on 50 portions in total to calculate a standard deviation of thickness.

<Formation of Multilayer Film>

The EVOH pellets obtained in Example 1 were used. A 3-resin 5-layer film (polypropylene layer/adhesive resin layer/EVOH resin layer/adhesive resin layer/polypropylene layer) was obtained using a coextrusion multilayer film forming device equipped with a 3-resin 5-layer feed block, a die for multilayer film formation, and a take-up device. "Novatec EG7FTB", manufactured by Japan Polypropylene Corp., was used as the polypropylene layers, and "ADMER QF551", manufactured by Mitsui Chemicals, Inc., was used as the adhesive resin.

The extrusion molding conditions included a die temperature of 220° C., and the extrudate was cooled with a chill roll through which 50° C. cooling water was circulated. The structure (thicknesses (μm)) of the 3-resin 5-layer film was such that polypropylene/adhesive resin/EVOH resin/adhesive resin/polypropylene was 540/30/60/30/540.

(Dispersed-Particle Diameter (μm))

A strip of 5 mm×30 mm was cut out of the 3-resin 5-layer film obtained above. The strip sample, in the state of being held at both ends with radio pliers, was immersed in liquid nitrogen for about 1 minute. After the strip sample was taken out therefrom, the sample was quickly snapped at the center. The snapped strip sample was introduced into a 50-mL vial containing 30 mL of methanol, and the vial was capped. This vial was immersed in 60° C. water placed in a "bench ultrasonic cleaner CPXI-12800 (manufactured by BRANSON)" and treated with ultrasonic waves (FULL mode) for 90 minutes. Thereafter, the snapped strip sample was taken out of the vial and dried with a vacuum dryer (degree of vacuum, 730 mmHg; temperature, room temperature) for 1 hour. The surfaces formed by napping of the dried sample were coated with platinum/palladium using "Ion Sputter E1010", manufactured by Hitachi, Ltd. The coated surfaces formed by snapping were analyzed with a scanning electron microscope (JSM 6510LA) manufactured by JEOL Ltd., and a secondary-electron image was examined under the conditions of the high-vacuum mode, accelerating voltage of 10 kV, and 10,000 diameters. Voids were observed in the secondary-electron image, and the minor-axis lengths of the voids were measured.

(Secondary Formability)

The multilayer structure obtained was fed to a plug-assisted vacuum/air-pressure forming machine (manufactured by Asano Laboratories Co., Ltd.), and stretch forming was conducted at a heater temperature of 500° C. to produce a cup (top diameter, 64 mm; bottom diameter. 53 mm; depth, 105 mm; draw ratio (depth (mm) of the shaped article)/(maximum diameter (mm) of the shaped article), 1.64). The appearance of the cup produced was visually examined and evaluate on the basis of the following criteria.

○ . . . Neither vertical streaks nor local thickness unevenness was substantially observed.

Δ . . . Considerable vertical streaks or considerable local thickness unevenness was observed in the sidewall of the cup.

× . . . Considerable vertical streaks and considerable local thickness unevenness were observed in the sidewall of the cup.

Example 2

The same procedure as in Example 1 was conducted, except that the period of the later-stage reaction was changed to 2 hours to change the total polymerization time period to 6 hours. Thus, EVOH pellets containing 0.11 part of volatile matter, 0.18 parts of sodium, 0.013 parts (in terms of phosphorus amount) of phosphoric acid radicals, and 0.13 parts (in terms of boron amount) of boric acid per 100 parts of the EVOH were obtained. This EVOH had an MFR of 4.9 g/10 min (210° C.; load, 2,160 g).

The EVOH obtained, when examined by liquid chromatography, gave an ethylene content distribution curve, in which two peaks were ascertained (see FIG. 3).

The EVOH obtained was subjected to the same evaluation as in Example 1.

Comparative Example 1

Eighty parts of an EVOH having an ethylene content of 29% by mote and a degree of saponification of 99.7% by mole (manufactured by The Nippon Synthetic Chemical Industry Co. Ltd.) was melt-kneaded together with 20 parts of an EVOH having an ethylene content of 48% by mole and a degree of saponification of 99.7% by mole (manufactured by The Nippon Synthetic Chemical Industry Co. Ltd.), and the mixture was extruded in the form of strands. The resultant strands were cut with a cutter to obtain EVOH pellets. This EVOH had an MFR of 5.0 g/10 min (210° C.; load, 2,160 g).

The EVOH obtained, when examined by liquid chromatography, gave an ethylene content distribution curve, which shows a distribution of ethylene contents, and two peaks were ascertained in the distribution curve (see FIG. 4), The EVOH obtained was subjected to the same evaluation as in Example 1.

Comparative Example 2

Into a 1-m$^3$ polymerization tank equipped with a cooling coil were introduced 350 kg of vinyl acetate, 80 kg of methanol, 60 g of t-butyl peroxyneodecanoate, and 10 g of citric, acid. The system was temporarily replaced with nitrogen gas and then with ethylene, and ethylene was further forced into the polymerization tank until the ethylene pressure reached 35 kg/cm$^2$. While the contents were being stirred, the temperature was elevated to 67° C. to initiate a polymerization reaction. The polymerization reaction was then conducted while keeping the reaction temperature at 67° C. and while adding ethylene over 5 hours at a constant rate until the ethylene pressure increased from 35 kg/cm$^2$ to 67 kg/cm$^2$ (intermediate reaction only). Thereafter, the polymerization reaction was terminated to obtain an ethylene-vinyl acetate copolymer.

Subsequently, the liquid reaction mixture containing the ethylene-vinyl acetate copolymer was supplied to a distillation column, and methanol vapor was introduced into a lower part of the column to thereby remove the unreacted vinyl acetate. Thus, a methanol solution of the ethylene-vinyl acetate copolymer was obtained.

A methanol solution containing sodium hydroxide in an amount of 0.009 equivalents to the residual acetic acid groups of the ethylene-vinyl acetate copolymer was supplied to the methanol solution of the copolymer to saponify the copolymer, thereby obtaining a methanol solution of an EVOH (EVOH, 30%; methanol, 70%). The acetyloxy moieties of this EVOH had a degree of saponification of 99.6% by mole.

The EVOH solution in methanol obtained was extruded in the form of strands into cold water, and the strands obtained (hydrous porous object) were cut with a cutter to obtain porous EVOH resin pellets having a diameter of 3.8 mm, a length of 4 mm and a resin content of 35%.

The porous pellets obtained were washed with water until the sodium content was reduced to 0.06 parts per 100 parts of the EVOH. Thereafter, the pellets were immersed for 4 hours in 500 parts of water containing 0.17 parts of acetic acid, 0.027 parts (in terms of phosphorus amount) of phosphoric acid, 0.002 parts (in terms of phosphorus amount) of calcium phosphate, and 0.036 parts (in terms of boron amount) of boric acid per 100 parts of the EVOH. Subsequently, the porous pellets obtained were dried at 110° C. for 8 hours in a nitrogen stream having an oxygen concentration of 0.5% or less, thereby obtaining EVOH pellets which contained 0.16 parts of volatile matter, 0.02 parts of sodium, 0.005 parts (in terms of phosphorus amount) of phosphoric acid radicals, and 0.28 parts (in terms of boron amount) of boric acid per 100 parts of the EVOH. This EVOH had an MFR of 3.0 g/10 min (210° C.; load, 2,160 g).

The EVOH obtained, when examined by liquid chromatography, gave an ethylene content distribution curve, which shows a distribution of ethylene contents, and two peaks were ascertained in the distribution curve (see FIG. 5).

The EVOH obtained was subjected to the same evaluation as in Example 1. This EVOH had poor gas barrier properties, although excellent in terms of melt moldability.

The results obtained in the Examples and Comparative Examples are shown in Table 1. The "[Component amount (v1)]/[average component amount (v2)]" in Table 1 indicates that the maximum value of ordinate in the two regions (W) is what times the average value of ordinate in the two regions (W), and corresponds to [IV] among the requirements shown hereinabove.

TABLE 1

| | Example 1 | Example 2 | Comparative Example 1 | Comparative Example 2 |
|---|---|---|---|---|
| Ethylene content (a) of highest peak (A) (% by mole) | 31 | 30 | 30 | 39 |
| Ethylene content (b) of second highest Peak (B) (% by mole) | 53 | 52 | 50 | 33 |
| Proportion (v) (%) | 11.7 | 13.0 | 2.9 | 17.3 |
| [Component amount (v1)/average component amount (v2)] | 1.58 | 1.52 | 3.18 | 1.04 |
| Difference between ethylene content (a) and ethylene content (b) (% by mole) | 22 | 22 | 20 | 6 |
| Dispersed-particle diameter (μm) | 0.1-0.3 | 0.1-0.5 | 0.3-1.5 | — |
| Gas barrier property (cc · 20 μm/m² · day · atm) | 0.21 | 0.28 | 0.27 | 0.77 |
| Melt moldability (standard variation of thickness) | 4.7 | 2.7 | 12 | 2.5 |
| Secondary Formability | ○ | ○ | ○ | — |

It can be seen from these results that the Examples, in each of which the ethylene composition of EVOH satisfied all of the requirements [I] to [IV], were excellent in terms of gas barrier property, melt moldability, and secondary formability, whereas the Comparative Examples, which each did not satisfy all the requirements, did not have an excellent balance among gas barrier properties, melt moldability, and secondary formability.

While the invention has been described in detail and with reference to specific embodiments thereof, it will be apparent to one skilled in the art that various changes and modifications can be made therein without departing from the spirit and scope thereof. This application is based on a Japanese patent application filed on Apr. 23, 2015 (Application No. 2015-088467), the contents thereof being incorporated herein by reference.

INDUSTRIAL APPLICABILITY

Since the EVOH of the invention has a specific ethylene composition, this EVOH is excellent in terms of gas barrier property, melt moldability, and formability. This EVOH can be formed into containers each including a cup, tray, tube, or the like or into bags or covers each including a stretched film, and can be effectively utilized as various kinds of packaging materials for foods, beverages, medicines, cosmetics, industrial chemicals, detergents, agricultural chemicals, fuels, etc.

The invention claimed is:

1. An ethylene-vinyl alcohol copolymer that, when examined by liquid chromatography, gives an ethylene content distribution curve that has at least two peaks and that satisfies the following [I] to [IV]:
[I] an ethylene content (a) of a component that has a highest peak (A) is 20-35% by mole;
[II] an ethylene content (b) of a component that has a second highest peak (B) is 45-60% by mole;
[III] when the abscissa ranging from the highest peak (A) to the second highest peak (B) is divided into four equal parts, then a proportion (v) of component(s) (V) that has ethylene content (w) corresponding to the two regions (W) having therebetween a center (C) that lies midway between the highest peak (A) and the second highest peak (B) to the whole copolymer is 5-25%; and
[IV] a maximum value of the ordinate in the two regions (W) is not larger than two times an average value of the ordinate in the two regions (W).

2. The ethylene-vinyl alcohol copolymer according to claim 1, wherein a difference between the ethylene content (a) of the component that has the highest peak (A) and the ethylene content (b) of the component that has the second highest peak (B) is 10-30% by mole.

3. A laminate including at least one layer comprising: the ethylene-vinyl alcohol copolymer according to claim 1.

4. The ethylene-vinyl alcohol copolymer according to claim 1, wherein a difference between the ethylene content (a) of the component that has the highest peak (A) and the ethylene content (b) of the component that has the second highest peak (B) is 15% by mole.

* * * * *